(12) United States Patent
Hou et al.

(10) Patent No.: US 12,085,471 B2
(45) Date of Patent: Sep. 10, 2024

(54) PNEUMATIC PROTECTION DEVICE AND ITS WORKING METHOD FOR TRIAXIAL AIR-BEARING TURNTABLE

(71) Applicant: HUNAN LANYUE Mechanical and Electrical Technology Co., Ltd, Changsha (CN)

(72) Inventors: Jianjun Hou, Changsha (CN); Jinbang Du, Changsha (CN); Jianmin Wang, Changsha (CN); Wugang Tian, Changsha (CN)

(73) Assignee: HUNAN LANYUE MECHANICAL AND ELECTRICAL TECHNOLOGY CO., LTD, Changsha (CN)

( * ) Notice: Subject to any disclaimer, the term of this patent is extended or adjusted under 35 U.S.C. 154(b) by 0 days.

(21) Appl. No.: 18/433,451

(22) Filed: Feb. 6, 2024

(65) Prior Publication Data
US 2024/0264027 A1 Aug. 8, 2024

(30) Foreign Application Priority Data
Feb. 6, 2023 (CN) .......................... 202310068894.7

(51) Int. Cl.
*B64G 7/00* (2006.01)
*G01M 1/14* (2006.01)
*G01M 17/00* (2006.01)

(52) U.S. Cl.
CPC ................. *G01M 1/14* (2013.01); *B64G 7/00* (2013.01); *G01M 17/00* (2013.01)

(58) Field of Classification Search
CPC ............ B64G 7/00; G01M 1/14; G01M 17/00
See application file for complete search history.

(56) References Cited

U.S. PATENT DOCUMENTS

| 6,102,777 A * | 8/2000 | Duescher | ................ B24B 37/04 451/36 |
| 2006/0191148 A1 * | 8/2006 | Lippuner | ............... G01C 25/00 33/290 |

(Continued)

FOREIGN PATENT DOCUMENTS

| CN | 105139742 A | 12/2015 |
| CN | 109774969 A | 5/2019 |

(Continued)

*Primary Examiner* — Eric S. McCall
(74) *Attorney, Agent, or Firm* — Bayramoglu Law Offices LLC

(57) ABSTRACT

A pneumatic protection device for a triaxial air-bearing turntable and its working method are provided. The position limiting ring is located below the test platform and surrounds the air bearing hemisphere. Two first lifting support rods are connected below the position limiting ring, and each first lifting support rod is guided up and down, sliding on the linear bearing, which is fixed on the support frame. The lower part of the first lifting support rod is connected to the bearing mounting seat, and the bearing transmission shaft passes through the needle roller bearing. The two sides of the cylinder support bottom plate are connected and fixed on the support frame by connecting plate of a cylinder bottom plate. One end of the extending rod of the cylinder is connected to the cam connecting rod, and the two ends of the cam connecting rod are respectively connected to an irregular cam.

9 Claims, 4 Drawing Sheets

(56) References Cited

U.S. PATENT DOCUMENTS

| | | | | |
|---|---|---|---|---|
| 2007/0018511 A1* | 1/2007 | Schulz | ............... | G09B 9/042 |
| | | | | 472/43 |
| 2007/0039400 A1* | 2/2007 | Meyer | ............... | G01M 9/062 |
| | | | | 73/862.41 |
| 2007/0221418 A1* | 9/2007 | Meyer | ............... | G01M 9/062 |
| | | | | 177/171 |

FOREIGN PATENT DOCUMENTS

| | | |
|---|---|---|
| CN | 214274253 U | 9/2021 |
| CN | 214839718 U | 11/2021 |
| WO | 2014187237 A1 | 11/2014 |

\* cited by examiner

PNEUMATIC PROTECTION DEVICE AND ITS WORKING METHOD FOR TRIAXIAL AIR-BEARING TURNTABLE

CROSS-REFERENCE TO THE RELATED APPLICATIONS

This application is based upon and claims priority to Chinese Patent Application No. 202310068894.7, filed on Feb. 6, 2023, the entire contents of which are incorporated herein by reference.

TECHNICAL FIELD

The invention relates to the technical field of mechanics, in particular to a pneumatic protection device for a triaxial air-bearing turntable, and its working method.

BACKGROUND

Working environment of a spacecraft is gravity free, so many components of the spacecraft need to simulate a microgravity and low friction test environment when tested on the ground. Some subsystems of the spacecraft require the ability to achieve three degrees of freedom in space motion. Therefore, a triaxial air-bearing turntable is a very good choice.

When placing a test platform with test components or subsystems on the triaxial air-bearing turntable for testing, there are following problems that may occur. When an executing mechanism controls the test platform to pitch or roll, it is easy for the test platform to deviate beyond a set angle, and in severe cases, it may cause the test platform to tilt and touch the ground at a large angle. After an experiment, an air bearing seat below the test platform comes into contact with an air bearing hemisphere in a state of no air source, which can easily cause scratches when separating the two.

SUMMARY

In order to overcome the defects of the prior art, the technical problem to be solved by the invention is to provide a pneumatic protection device for a triaxial air-bearing turntable, which can prevent the test platform from exceeding the set deflection angle when the executing mechanism controls the test platform to pitch or roll, avoiding the test platform to touch the ground at a large angle. After the experiment is completed, separate the air bearing seat and air bearing hemisphere below the test platform, so that the two can be in a non-contact and scratch free state without an air source, and can be far away from the test platform and the triaxial air-bearing turntable to achieve the above goals.

The technical scheme of the invention is as follows.

In the pneumatic protection device for a triaxial air-bearing turntable, the triaxial air-bearing turntable is installed on a support frame and comprises an air bearing support seat and an air bearing hemisphere. The air bearing support seat provides high-pressure gas lubrication to make the air bearing hemisphere freely roll and rotate in a ball socket of the air bearing support seat. A test platform is placed on an adapter plate, which is placed above the air bearing hemisphere.

The pneumatic protection device comprises a position limiting ring, first lifting support rods, a linear bearing, a cylinder, a connecting plate of a cylinder bottom plate, a bearing mounting seat, a bearing transmission shaft, a needle roller bearing, a cylinder support bottom plate, and an irregular cam.

The position limiting ring is located below the test platform and surrounds the air bearing hemisphere. Two first lifting support rods are connected below the position limiting ring, and each first lifting support rod is guided up and down, sliding on the linear bearing, which is fixed on the support frame. The lower part of the first lifting support rod is connected to the bearing mounting seat, and the bearing transmission shaft passes through the needle roller bearing. The two sides of the cylinder support bottom plate are connected and fixed on the support frame by connecting plate of a cylinder bottom plate. One end of the extending rod of the cylinder is connected to the cam connecting rod, and the two ends of the cam connecting rod are respectively connected to an irregular cam. The irregular cam comprises a front high and rear low shaped irregular working surface, and two needle roller bearings connected to two first lifting support rods roll on the irregular working surface of the irregular cam.

In the invention the position limiting ring is located below the test platform and surrounds the air bearing hemisphere. Two first lifting support rods are connected below the position limiting ring, and each first lifting support rod is guided up and down, sliding on the linear bearing, which is fixed on the support frame. The lower part of the first lifting support rod is connected to the bearing mounting seat, and the bearing transmission shaft passes through the needle roller bearing. The two sides of the cylinder support bottom plate are connected and fixed on the support frame by connecting plate of a cylinder bottom plate. One end of the extending rod of the cylinder is connected to the cam connecting rod, and the two ends of the cam connecting rod are respectively connected to an irregular cam. The irregular cam comprises a front high and rear low shaped irregular working surface, and two needle roller bearings connected to two first lifting support rods roll on the irregular working surface of the irregular cam. When the cylinder is in an extended state, a lower irregular working surface of the irregular cam contacts the needle roller bearing, causing the two first lifting support rods to be at a low point, thereby causing the position limiting ring on them at the low point and limiting the deflection angle of the test platform. Therefore, it can prevent the test platform from exceeding the set deflection angle when the executing mechanism controls the test platform to pitch or roll, avoiding the test platform to touch the ground at a large angle. After the experiment is completed, a certain amount of air pressure is applied to the cylinder to push a cylinder piston rod and drive a cam connecting rod forward to drive the cam to slide backward. A working surface of the cam is front high and rear low shaped. Under the guidance of the linear bearing the needle roller bearing crawls on the working surface of the cam to a high point and drives the position limiting ring above the lifting support rod to move upward, separating the test platform from the air bearing hemisphere, and preventing the air bearing hemisphere from directly contacting the air bearing support seat to cause damage. In addition, because there is no need to manipulate the position limiting ring up close, the above objectives can be achieved by staying away from the test platform and triaxial air-bearing turntable.

A working method for the pneumatic protection device for a triaxial air-bearing turntable is also provided, which, comprising the following steps:

(1) during a test, the cylinder is in an extended state and the position limiting ring is at a low point, limiting a deflection angle of the test platform to determine its balance state, and
(2) after the experiment is completed, applying a certain amount of air pressure to the cylinder to push a cylinder piston rod and drive a cam connecting rod forward to drive the cam to slide backward, a working surface of the cam is front high and rear low shaped, under the guidance of the linear bearing the needle roller bearing crawling on the working surface of the cam and driving the position limiting ring above the lifting support rod to move upward, separating the test platform from the air bearing hemisphere, and allowing the air bearing hemisphere and the air bearing support seat to be no contact or friction in a state of no air source after the experiment is stopped.

DETAILED DESCRIPTION OF THE EMBODIMENTS

Figure 1:
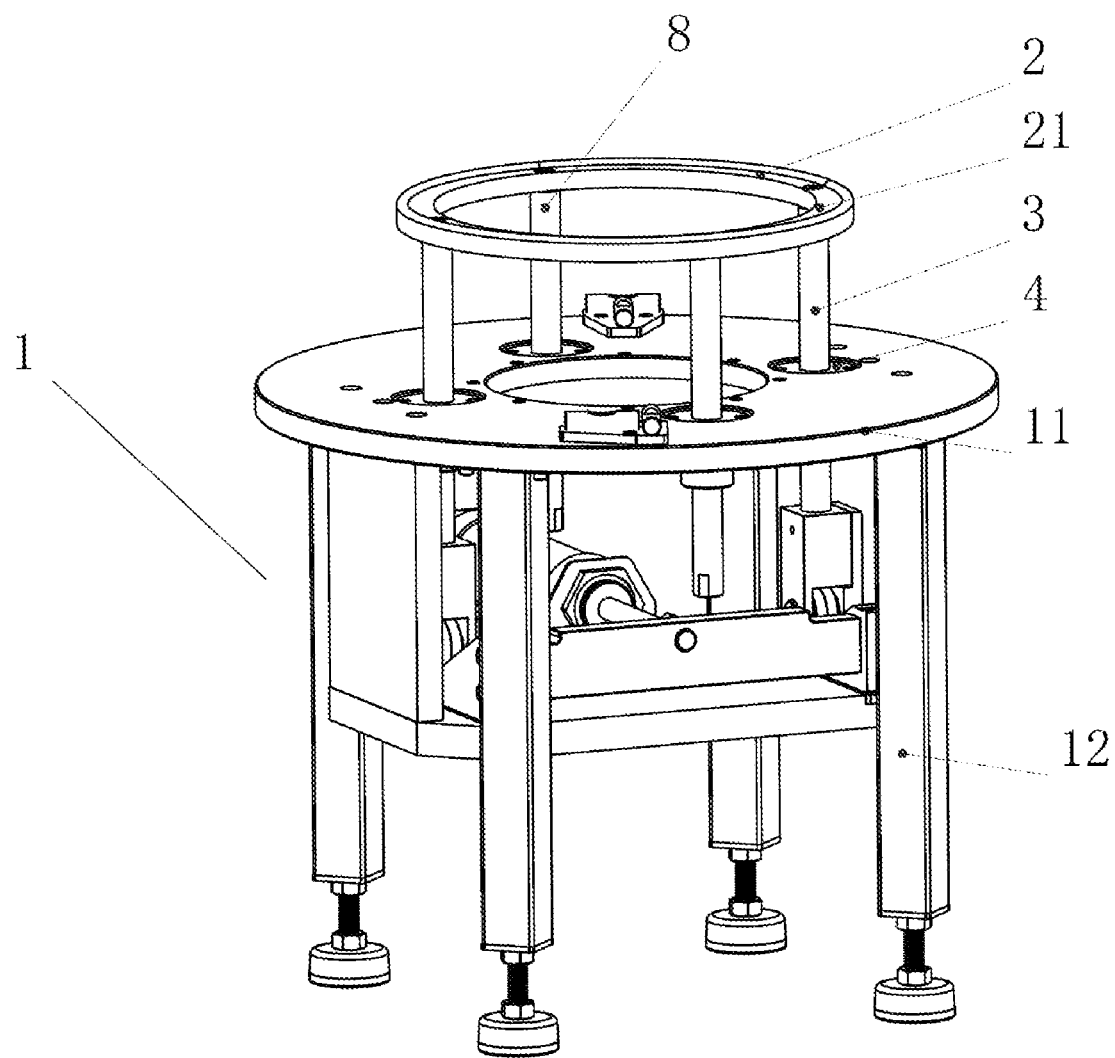
FIG. 1 is a schematic diagram showing the pneumatic protection device for a triaxial air-bearing turntable according to the present invention, where the position limiting ring is at a low point.

As shown in FIGS. 1-4, in the pneumatic protection device for a triaxial air-bearing turntable, the triaxial air-bearing turntable is installed on a support frame 1 and comprises an air bearing support seat and an air bearing hemisphere. The air bearing support seat provides high-pressure gas lubrication to make the air bearing hemisphere freely roll and rotate in a ball socket of the air bearing support seat. A test platform is placed on an adapter plate, which is placed above the air bearing hemisphere.

The pneumatic protection device comprises a position limiting ring 2, first lifting support rods 3, a linear bearing 4, a cylinder 5, a connecting plate of a cylinder bottom plate 51, a bearing mounting seat 41, a bearing transmission shaft 42, a needle roller bearing 6, a cylinder support bottom plate 52, and an irregular cam 7.

The position limiting ring is located below the test platform and surrounds the air bearing hemisphere. Two first lifting support rods are connected below the position limiting ring, and each first lifting support rod is guided up and down, sliding on the linear bearing, which is fixed on the support frame. The lower part of the first lifting support rod is connected to the bearing mounting seat, and the bearing transmission shaft passes through the needle roller bearing. The two sides of the cylinder support bottom plate are connected and fixed on the support frame by connecting plate of a cylinder bottom plate. One end of the extending rod of the cylinder is connected to the cam connecting rod, and the two ends of the cam connecting rod are respectively connected to an irregular cam. The irregular cam comprises a front high and rear low shaped irregular working surface, and two needle roller bearings connected to two first lifting support rods roll on the irregular working surface of the irregular cam.

In the invention the position limiting ring is located below the test platform and surrounds the air bearing hemisphere. Two first lifting support rods are connected below the position limiting ring, and each first lifting support rod is guided up and down, sliding on the linear bearing, which is fixed on the support frame. The lower part of the first lifting support rod is connected to the bearing mounting seat, and the bearing transmission shaft passes through the needle roller bearing. The two sides of the cylinder support bottom plate are connected and fixed on the support frame by connecting plate of a cylinder bottom plate. One end of the extending rod of the cylinder is connected to the cam connecting rod, and the two ends of the cam connecting rod are respectively connected to an irregular cam. The irregular cam comprises a front high and rear low shaped irregular working surface, and two needle roller bearings connected to two first lifting support rods roll on the irregular working surface of the irregular cam. When the cylinder is in an extended state, a lower irregular working surface of the irregular cam contacts the needle roller bearing, causing the two first lifting support rods to be at a low point, thereby causing the position limiting ring on them at the low point and limiting the deflection angle of the test platform. Therefore, it can prevent the test platform from exceeding the set deflection angle when the executing mechanism controls the test platform to pitch or roll, avoiding the test platform to touch the ground at a large angle. After the experiment is completed, a certain amount of air pressure is applied to the cylinder to push a cylinder piston rod and drive a cam connecting rod forward to drive the cam to slide backward. A working surface of the cam is front high and rear low shaped. Under the guidance of the linear bearing the needle roller bearing crawls on the working surface of the cam to a high point and drives the position limiting ring above the lifting support rod to move upward, separating the test platform from the air bearing hemisphere, and preventing the air bearing hemisphere from directly contacting the air bearing support seat to cause damage. In addition, because there is no need to manipulate the position limiting ring up close, the above objectives can be achieved by staying away from the test platform and triaxial air-bearing turntable.

Figure 2:
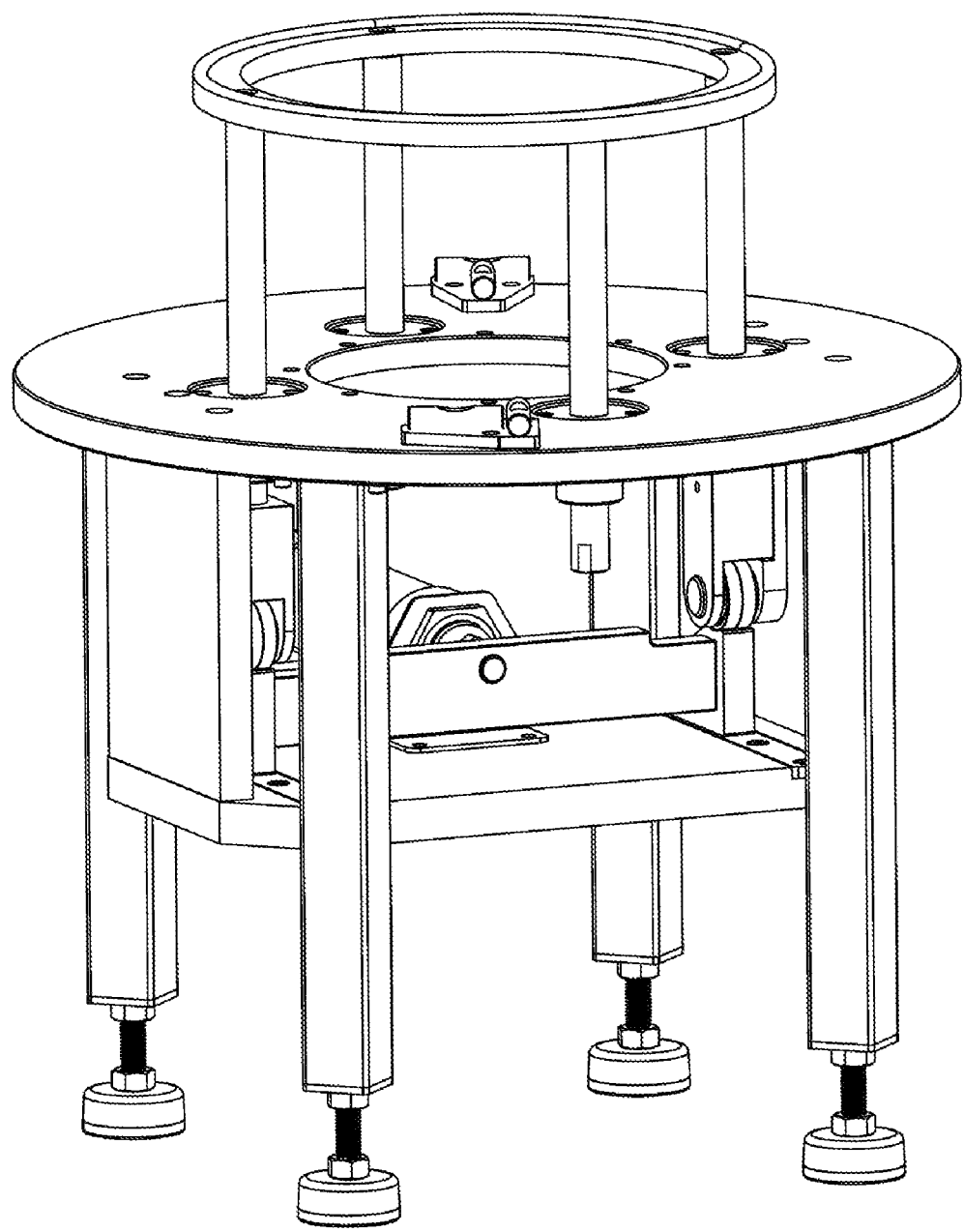
FIG. 2 is a schematic diagram showing the pneumatic protection device for a triaxial air-bearing turntable according to the present invention, where the position limiting ring is at a high point.
Figure 4:
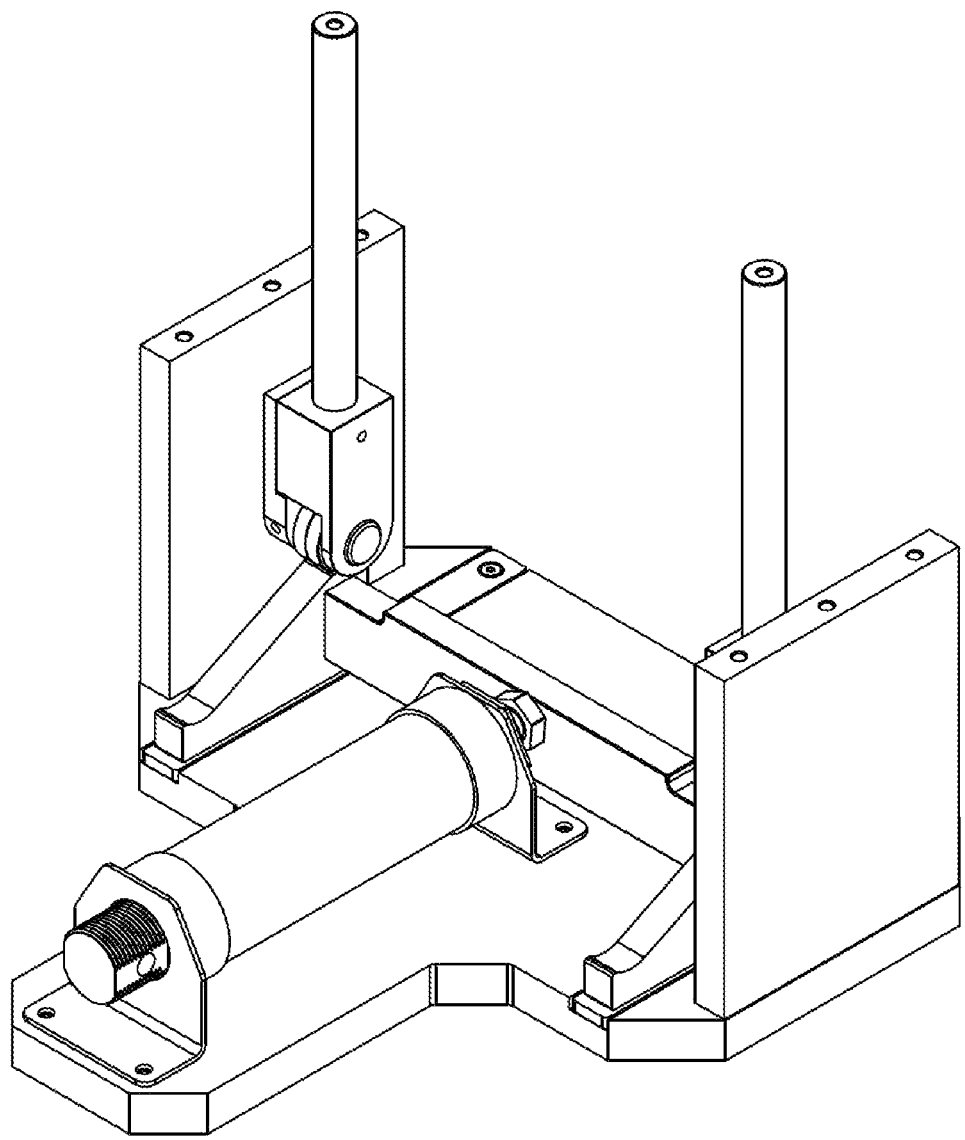
FIG. 4 is a partial schematic diagram of FIG. 2.

Preferably, as shown in FIGS. 2, 4, the device also comprises two cylinder mounting brackets 53, which are respectively set at the front and rear of the cylinder support bottom plate, and the cylinder is mounted on the front and rear cylinder mounting brackets, which can more securely fix the cylinder.

Figure 3:
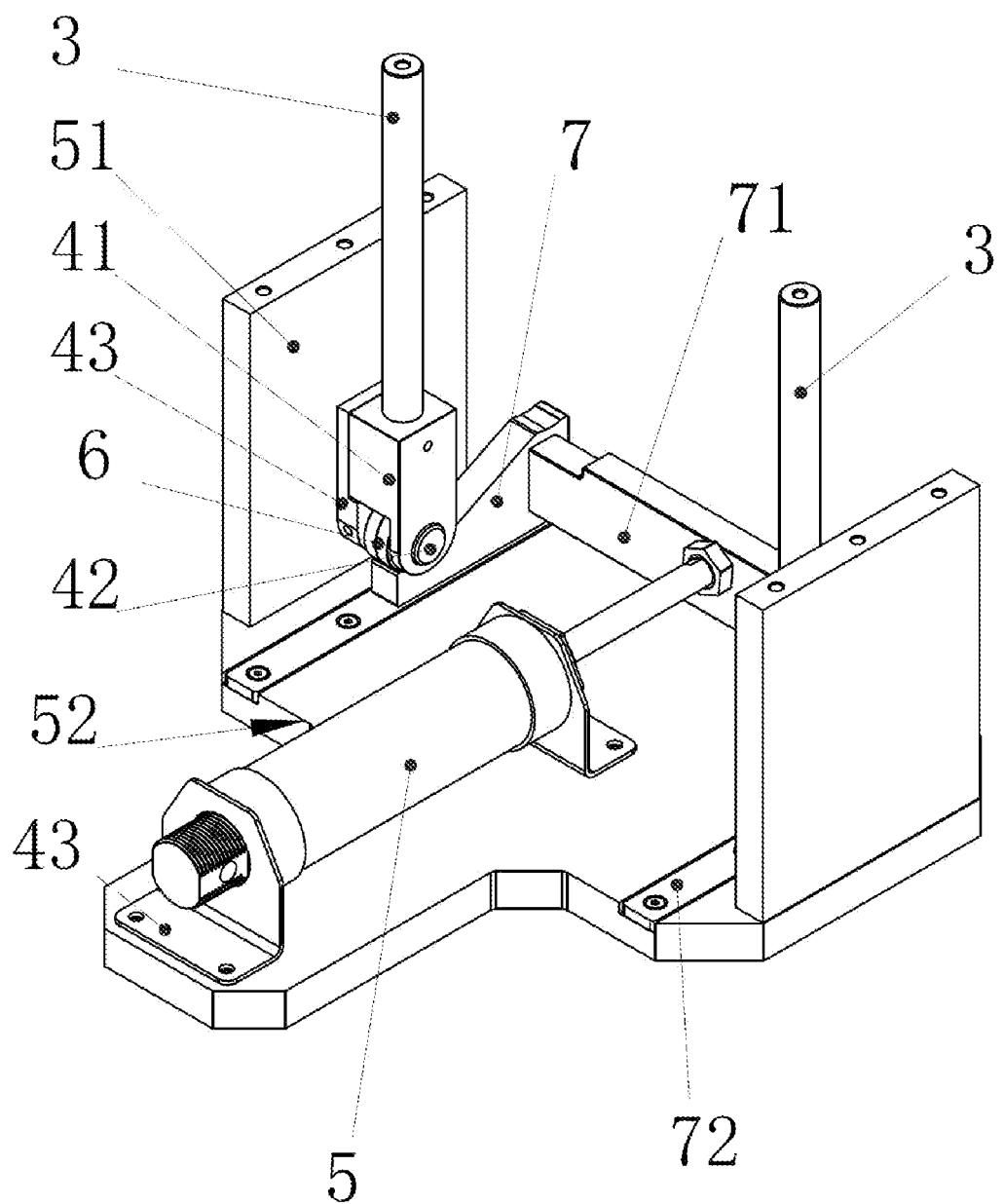
FIG. 3 is a partial schematic diagram of FIG. 1.

Preferably, as shown in FIGS. 1, 3, the device also comprises two second lifting support rods 8, which are connected below the position limiting ring and suspended below, evenly distributed below the position limiting ring with the two first lifting support rods, which can make the position limiting ring more stable to be placed on the support platform.

Preferably, as shown in FIGS. 2, 4, the device also comprises bearing blocks 43, which limit and fix an inner ring of the needle roller bearing. The use of bearing blocks can prevent the needle roller bearings from detaching from control.

Preferably, as shown in FIG. 1, a silicone gasket 21 is installed in a concave position of the position limiting ring. This can make the test platform contact the position limiting ring with a soft silicone gasket, reducing damage.

Preferably, as shown in FIGS. 2, 4, a cam slider 72 is installed on the cylinder support bottom plate, and the lower part of the irregular cam contacts the cam slider, thereby reducing the friction between the cam and the cylinder support bottom plate, and extending the service life of the cam.

Preferably, as shown in FIGS. 1, 3, the support frame comprises supporting leg columns 11 and a support platform 12, the supporting leg columns are installed below the support platform, adjustable supporting leg columns are used to adjust height of the support frame, and the triaxial air-bearing turntable is installed on the support platform.

Preferably, as shown in FIGS. 2, 4, the number of the supporting leg columns is four, evenly distributed below the support platform. This structure makes the support platform and its upper components more stable.

A working method for the pneumatic protection device for a triaxial air-bearing turntable is also provided, which, comprising the following steps:

(1) during a test, the cylinder is in an extended state and the position limiting ring is at a low point, limiting a deflection angle of the test platform to determine its balance state, and (2) after the experiment is completed, applying a certain amount of air pressure to the cylinder to push a cylinder piston rod and drive a cam connecting rod forward to drive the cam to slide backward, a working surface of the cam is front high and rear low shaped, under the guidance of the linear bearing the needle roller bearing crawling on the working surface of the cam and driving the position limiting ring above the lifting support rod to move upward, separating the test platform from the air bearing hemisphere, and allowing the air bearing hemisphere and the air bearing support seat to be no contact or friction in a state of no air source after the experiment is stopped.

The above contents are only the preferable embodiments of the present invention, and do not limit the present invention in any manner. Any improvements, amendments and alternative changes made to the above embodiments according to the technical spirit of the present invention shall fall within the claimed scope of the present invention.

What is claimed is:

1. A pneumatic protection device for a triaxial air-bearing turntable, wherein the triaxial air-bearing turntable is installed on a support frame and comprises an air bearing support seat and an air bearing hemisphere, the air bearing support seat provides high-pressure gas lubrication to make the air bearing hemisphere freely roll and rotate in a ball socket of the air bearing support seat, a test platform is placed on an adapter plate, the adapter plate is placed above the air bearing hemisphere, the pneumatic protection device comprises a position limiting ring, first lifting support rods, a linear bearing, a cylinder, a connecting plate of a cylinder bottom plate, a bearing mounting seat, a bearing transmission shaft, a needle roller bearing, a cylinder support bottom plate, and an irregular cam, the position limiting ring is located below the test platform and surrounds the air bearing hemisphere, two first lifting support rods are connected below the position limiting ring, and each of the two first lifting support rods is guided up and down, sliding on the linear bearing, the linear bearing is fixed on the support frame, a lower part of the first lifting support rod is connected to the bearing mounting seat, and the bearing transmission shaft passes through the needle roller bearing, two sides of the cylinder support bottom plate are connected and fixed on the support frame by connecting plate of a cylinder bottom plate, one end of an extending rod of the cylinder is connected to a cam connecting rod, and two ends of the cam connecting rod are respectively connected to the irregular cam, the irregular cam comprises a front high and rear low shaped irregular working surface, and two needle roller bearings connected to the two first lifting support rods roll on the irregular working surface of the irregular cam.

2. The pneumatic protection device for the triaxial air-bearing turntable according to claim 1, wherein the pneumatic protection device further comprises two cylinder mounting brackets, the two cylinder mounting brackets are respectively set at the front and rear of the cylinder support bottom plate, and the cylinder is mounted on the front and rear cylinder mounting brackets.

3. The pneumatic protection device for the triaxial air-bearing turntable according to claim 2, wherein the pneumatic protection device further comprises two second lifting support rods, the two second lifting support rods are connected below the position limiting ring and suspended below, evenly distributed below the position limiting ring with the two first lifting support rods.

4. The pneumatic protection device for the triaxial air-bearing turntable according to claim 3, wherein the pneumatic protection device further comprises bearing blocks, the bearing blocks limit and fix an inner ring of the needle roller bearing.

5. The pneumatic protection device for the triaxial air-bearing turntable according to claim 4, wherein a silicone gasket is installed in a concave position of the position limiting ring.

6. The pneumatic protection device for the triaxial air-bearing turntable according to claim 5, wherein a cam slider is installed on the cylinder support bottom plate, and a lower part of the irregular cam contacts the cam slider.

7. A working method for the pneumatic protection device for the triaxial air-bearing turntable according to claim 6 is further provided, wherein the working method comprises the following steps:

1) During a test, the cylinder is in an extended state and the position limiting ring is at a low point, limiting a deflection angle of the test platform to determine a balance state of the test platform, and 2) After the experiment is completed, applying a predetermined amount of air pressure to the cylinder to push the extending rod of the cylinder and drive the cam connecting rod backward to drive the irregular cam to slide backward, the irregular working surface of the irregular cam is front high and rear low shaped, under a guidance of the linear bearing, the needle roller bearing crawling on the irregular working surface of the irregular cam and driving the position limiting ring above the first lifting support rod to move upward, separating the test platform from the air bearing hemisphere, and allowing the air bearing hemisphere and the air bearing support seat to be no contact or friction in a state of no air source after the experiment is stopped.

8. The pneumatic protection device for the triaxial air-bearing turntable according to claim 1, wherein the support frame comprises supporting leg columns and a support platform, the supporting leg columns are installed below the support platform, the supporting leg columns are adjustable and configured to adjust height of the support frame, and the triaxial air-bearing turntable is installed on the support platform.

9. The pneumatic protection device for the triaxial air-bearing turntable according to claim 8, wherein the number of the supporting leg columns is four, and the four supporting leg columns are evenly distributed below the support platform.

<p style="text-align:center">* * * * *</p>